United States Patent
Thygesen et al.

(10) Patent No.: US 10,389,210 B2
(45) Date of Patent: Aug. 20, 2019

(54) STATOR ASSEMBLY WITH A CABLE WIRING ARRANGEMENT, GENERATOR AND WIND TURBINE WITH SUCH A STATOR ASSEMBLY

(71) Applicant: Siemens Gamesa Renewable Energy A/S, Brande OT (DK)

(72) Inventors: Claus Thygesen, Låsby (DK); Edom Lemma, Vejle (DK)

(73) Assignee: Siemens Gamesa Renewable Energy A/S (DK)

(*) Notice: Subject to any disclaimer, the term of this patent is extended or adjusted under 35 U.S.C. 154(b) by 4 days.

(21) Appl. No.: 15/608,194

(22) Filed: May 30, 2017

(65) Prior Publication Data

US 2017/0353080 A1 Dec. 7, 2017

(30) Foreign Application Priority Data

Jun. 3, 2016 (EP) .................................. 16172892

(51) Int. Cl.
*H02K 7/18* (2006.01)
*H02K 11/01* (2016.01)
(Continued)

(52) U.S. Cl.
CPC ............... *H02K 7/183* (2013.01); *F03D 1/06* (2013.01); *F03D 7/0224* (2013.01); *H02K 1/146* (2013.01);
(Continued)

(58) Field of Classification Search
CPC ..... F03D 1/00; F03D 1/06; F03D 7/02; F03D 7/224; F03D 7/18; F03D 7/1838;
(Continued)

(56) References Cited

U.S. PATENT DOCUMENTS 6,967,554 B2 11/2005 Eydelie et al.
7,847,443 B2 * 12/2010 Farnia .................... H02K 1/148
310/209
(Continued)

FOREIGN PATENT DOCUMENTS

EP 1124284 A2 8/2001
EP 2928048 A1 10/2015
(Continued)

OTHER PUBLICATIONS

Extended European Search Report for EP Application No. 16172892. 8, dated Dec. 8, 2016.

*Primary Examiner* — Tran N Nguyen
(74) *Attorney, Agent, or Firm* — Schmeiser, Olsen & Watts LLP (57) ABSTRACT

A stator assembly includes a stator frame structure having an outer annular frame with an outer edge running around a center axis; a plurality of stator segments mounted at the outer edge along a circumferential direction of the outer edge, each stator segment comprising at least one electric coil; and a wiring arrangement electrically connecting the stator segments with an electric power interface. The wiring arrangement comprises a plurality of wiring assemblies, each wiring assembly electrically connecting one of the plurality of stator segments with the power interface is provided. Each wiring assembly is routed along and next to the outer annular frame and comprises electric cables connected in between the electric interface and the respective stator segment, wherein the electric cables are provided with electric insulation structures each surrounding one of the electric cables. Further described is an electric generator and a wind turbine with such a stator assembly.

17 Claims, 7 Drawing Sheets

(51) Int. Cl.
*F03D 1/06* (2006.01)
*F03D 7/02* (2006.01)
*H02K 1/14* (2006.01)
*H02K 1/27* (2006.01)
*H02K 3/18* (2006.01)
*H02K 3/28* (2006.01)
*H02K 3/50* (2006.01)
*H02K 9/04* (2006.01)

(52) U.S. Cl.
CPC ............ *H02K 1/2786* (2013.01); *H02K 3/18* (2013.01); *H02K 3/28* (2013.01); *H02K 3/505* (2013.01); *H02K 7/1838* (2013.01); *H02K 9/04* (2013.01); *H02K 11/01* (2016.01); *H02K 2213/06* (2013.01); *H02K 2213/12* (2013.01); *Y02E 10/721* (2013.01); *Y02E 10/725* (2013.01)

(58) Field of Classification Search
CPC . F03D 9/25; H02K 11/01; H02K 3/18; H02K 3/28; H02K 3/505; H02K 1/14; H02K 1/146; H02K 1/18; H02K 1/187; H02K 7/10; H02K 7/10211; H02K 7/116; H02K 7/18; H02K 7/1838; H02K 9/04; H02K 9/10; H02K 9/19; H02K 15/00; H02K 15/0006; H02K 5/22
See application file for complete search history.

(56) References Cited

U.S. PATENT DOCUMENTS

| | | | | |
|---|---|---|---|---|
| 2002/0148099 | A1* | 10/2002 | Eydelie | H02K 3/18 29/596 |
| 2003/0193265 | A1* | 10/2003 | Maslov | H02K 1/187 310/254.1 |
| 2009/0102307 | A1* | 4/2009 | Amano | H02K 3/28 310/195 |
| 2009/0140526 | A1* | 6/2009 | Jansen | H02K 1/14 290/55 |
| 2015/0222151 | A1* | 8/2015 | Semken | H02K 1/148 310/216.008 |

FOREIGN PATENT DOCUMENTS

| | | |
|---|---|---|
| JP | 2009112085 A * | 5/2009 |
| WO | WO 0215367 A1 | 2/2002 |
| WO | WO 03067740 A1 | 8/2003 |
| WO | WO 2012093942 A1 | 7/2012 |
| WO | WO 2014033647 A2 | 3/2014 |

* cited by examiner

STATOR ASSEMBLY WITH A CABLE WIRING ARRANGEMENT, GENERATOR AND WIND TURBINE WITH SUCH A STATOR ASSEMBLY

CROSS-REFERENCE TO RELATED APPLICATIONS

This application claims priority to European application No. EP16172892.8 having a filing date of Jun. 3, 2016, the entire contents of which are hereby incorporated by reference.

FIELD OF TECHNOLOGY

The following relates to the technical field of electric generators for wind turbines. Specifically, embodiments of the present invention relate to a stator assembly comprising a plurality of stator segments which are electrically connected in order to forward electric power being generated with electric coils. Embodiments of the present invention further relate to an electric generator and a wind turbine with such a stator assembly.

BACKGROUND

Wind turbines can be erected on-shore or off-shore. Large wind turbines being capable of providing an electric power up to about 6 MW are typically installed off-shore. In particular for maintenance reasons self-excited generators having a rotor assembly with permanent magnets are employed. In the near future wind turbines being capable of providing an electric power in the order of more than 10 MW will be provided by wind turbine manufactures having a special expertise in the field of off-shore wind turbines. For several technical reasons an electric generator being capable of providing more than 10 MW of electrical power must have a diameter in the order of more than 7 m.

Such large wind turbine generators are typically realized as self-excited generators with an inner stator-outer rotor configuration. Thereby, a plurality of stator segments each comprising several electric coils or windings are mounted one next to each other along a circumferential direction at a circular outer edge of a stator frame structure. At a circular inner surface of a rotor frame assembly, which is torque proof connected to a wind rotor and which, in operation, rotates around the stator frame structure, there are mounted a plurality of permanent magnets which, when moving along the stator segments, produce a time alternating magnetic flux through each electric coil. This time alternating magnetic flux induces an electric current in each electric coil. The currents produced in each electric coil respectively by each one of the plurality of stator segments are collected or summed up and yield an electric power output of the generator.

Collecting the plurality of currents produced in the plurality of stator segments by an appropriate wiring arrangement is easy for small or medium sized electric generators which have a diameter of e.g. less than two or three meters. Known wiring arrangements comprise several massive bus bars for conducting the currents to an electric power interface of the generator. It is obvious that in larger electric generators it is more challenging to provide the stator assembly with an appropriate wiring arrangement as larger generators not only have a larger spatial dimension but also a higher number of stator segments which have to be electrically connected to an electric power interface. In particular, a high number of stator segments require a plurality of electric conductors which have to be mounted in a compact manner in and/or at a stator frame structure of the stator assembly.

There may be a need for providing a stator assembly having a plurality of stator segments with a wiring arrangement which can be realized in a compact manner and which can be mounted to a stator frame structure of the stator assembly in an easy and effective manner.

SUMMARY

According to a first aspect of embodiments of the invention there is provided a stator assembly comprising (a) a stator frame structure having an outer annular frame with a circular outer edge running concentrically around a center axis, which defines an axial direction; (b) a plurality of stator segments being mounted at the outer edge along a circumferential direction of the outer edge, wherein each stator segment comprises at least one electric coil; and (c) a wiring arrangement electrically connecting the plurality of stator segments with an electric power interface for collecting electric power generated by the stator segments and forwarding the collected electric power to a power transceiver. In accordance with embodiments of the invention the wiring arrangement comprises a plurality of wiring assemblies, each wiring assembly electrically connecting one of the plurality of stator segments with the electric power interface. Each wiring assembly is routed along and next to the outer annular frame and comprises electric cables connected in between the electric interface and the respective stator segment. The electric cables are provided with electric insulation structures each surrounding one of the electric cables.

The described stator assembly is based on the idea that (high power but) flexible cables which are insulated (with respect to each other and with respect to other parts of the stator assembly) can be used for a wiring arrangement which provides a plurality of electric connections between an electric power interface and a plurality stator segments mounted at a radial outer edge of a stator frame structure. Specifically, due to the (non-zero) mechanical flexibility of the cables the wiring arrangement can be mounted to the stator frame structure in an easy and effective manner when building up the entire stator assembly. The mechanical flexibility allows for spatially forming the cables in an appropriate manner and bringing them into a desired position at the stator frame structure such than even very strict spatial constraints for forming the wiring arrangement at the stator frame structure respectively within a generator comprising the described stator assembly can be fulfilled.

The mechanical flexibility may even allow the respective wiring assembly to be bended to a proper spatial shape after a first (end) section of the wiring assembly has already been installed. Thereby, geometric shapes may be adopted by the wiring assembly which, due to spatial constraints, could not be provided by a rigid bus bar structure.

Specifically, the flexible electric cables can be installed next to each other in at least one predetermined accommodation channel and/or at cable holders which are provided along the circumference of the outer edge next to the outer annular frame. When installing a cable or a cable arrangement it can first be cut to a specific length which corresponds, along and next to the outer annular frame, to the distance between the electric power interface and the respective stator segment. Then, the cable or a cable arrangement having a proper length can be brought in its final mounting position.

In preferred embodiments the wiring assemblies are free of solid and rigid bus bar structures. This may further facilitate an installation of the wiring arrangement at the outer annular frame.

The plurality of stator segments may be arranged one next to each other along a circular circumference around the center axis. Preferably, two neighboring stator segments adjoin each other such that the entire circumference can be exploited for "picking up", by the electric coils or windings of the stator segments, the time alternating magnetic flux produced by permanent magnets of a rotor assembly, which permanent magnets, in operation, are traveling next to the circumferential row of stator segments.

In particular in a so called direct drive wind turbine having no gear box in between (i) a wind rotor capturing mechanical energy from wind and (ii) the electric generator the described center axis may correspond or may be aligned with the rotational axis of the wind rotor. With regard to the spatial relationship between the plurality of wiring assemblies and the outer annular frame the center axis may define the direction of a (shortest) distance the respective wiring assembly and (an axial side face of) the outer annular frame.

The electric power interface may be any appropriate electric structure which is capable of collecting the individual electric currents respectively the individual power signals and forwarding the same to the mentioned power transceiver. It is mentioned that the electric power interface may be either (i) a compact electric structure wherein all electric cables run together or (ii) a spatially distributed structure wherein at different positions wiring assemblies are spatially combined.

The power transceiver may be a power converter which is electrically connected in between the electric power interface and a utility grid. In order to provide an AC power signal being matched with the AC frequency of the utility grid the power converter may comprise a generator side AC-DC converter, an intermediate DC bridge, and a grid side DC-AC converter. The AC-DC converter and the DC-AC converter comprise several high power semiconductor switches which, in a known manner, are arranged in a bridge configuration for each phase of an entire AC power signal provided by the electric generator. By controlling the high power semiconductor switches with an appropriate switching pattern the AC frequency of a power signal being delivered to the utility grid can be adapted in a known manner to the (given) AC frequency of the utility grid.

In the context of this document "radially" and "radial direction" means perpendicular to the "axial direction" being in line with the "center axis". In a cylindrical coordinate system being used in this document for describing the geometry of the stator assembly the "axial direction" along the center line corresponds to the "height coordinate" and the "radial direction" corresponds the Euclidean distance between the "center axis" and a point of interest. Further, "outer" means radially outer, i.e. a larger Euclidean distance and "inner" means radially inner, i.e. a smaller Euclidean distance.

According to an embodiment of embodiments of the invention each wiring assembly is associated exclusively with one stator segment. Descriptive speaking, the wiring arrangement exhibits a "star-configuration" in which each stator segment is electrically connected independently from the other stator segments with the electric power interface. This makes the design of the wiring arrangement simple.

Further, due to its "star-configuration" the wiring arrangement has a high degree of reliability because a failure in one wiring assembly only causes a failure in the electric connection between the electric power interface and one stator segment. Preferably, each wiring assembly comprises three electric cables, wherein one electric cable is assigned to one electric phase of a generated three-phase current.

According to a further embodiment each stator segment comprises (a) a first electric coil being assigned to a first electric phase of a three-phase current; (b) a second electric coil being assigned to a second electric phase of the three-phase current; and (c) a third electric coil being assigned to the third electric phase of the three-phase current. Further, each wiring assembly comprises (a) a first electric cable being connected to the first electrical coil; (b) a second electric cable being connected to the second electrical coil; and (c) a third electric cable being connected to the third electrical coil. This may provide the advantage that in normal operation each stator segment provides electric power for each phase and the coil being assigned to each phase of each stator segment is individually connected to the electric power interface. In other words, different stator segments respectively different wiring assemblies are electrically decoupled from each other. As a consequence, if a fault occurs within one electric cable and/or one coil such a fault will be restricted to the respective phase.

According to a further embodiment each stator segment further comprises (a) at least one further first electric coil being assigned to the first electric phase and being connected to the first electric cable; (c) at least one further second electric coil being assigned to the second electric phase and being connected to the second electric cable; and (c) at least one further third electric coil being assigned to the third electric phase and being connected to the third electric cable. Thereby, each one of the further electric coils is connected with the corresponding electric coil either in parallel or in series. Such a configuration may provide the advantage that each stator segment is capable of providing a higher amount of electric power. In case of a series connection between the first electric coil and the further first electric coil, the second electric coil and the further second electric coil, and the third electric coil and the further third electric coil, the voltage being provided by the stator segments is increased. In case of a parallel connection of the respective electric coils the current being provided by the respective stator segment is increased.

In some stator segment configurations each stator segment comprises, for each electric phase, at least two further electric coils, whereby the coils being assigned to one electric phase are connected in a configuration which comprises both a series connection and a parallel connection. In a currently preferred stator segment configuration each stator segment comprises altogether four electric coils for each phase, whereby respectively two coils are connected in series and the two series connections of coils are connected in parallel. This configuration represents a good compromise between increasing the electric warpage and the electric current being provided by each stator segment.

An appropriate electric connection between different coils may be realized by means of local bus bars. These local bus bars, which may be assigned to the respective stator segment, can be configured such that the respective stator segment will be realized with a compact spatial design.

According to a further embodiment. The stator assembly as set forth wherein the plurality of stator segments is subdivided into at least a first subset of stator segments and a second subset of stator segments, and the electric power interface comprises at least a first subordinate interface being assigned to the first subset and a second subordinate interface being assigned to the second subset, wherein the first subordinate interface and the second subordinate interface are spatially separated from each other.

Spatially distributing the electric power interface may provide the advantage that spatial restrictions given in the interior of the generator can be met more easily. Specifically, there is no need to spatially bring together the ends of all cables within a comparatively small region where the a not subdivided electric power interface is located.

According to a further embodiment the stator segments of the first subset are distributed uniformly along the circular outer edge and/or the stator segments of the second subset are distributed uniformly along the circular outer edge.

This configuration of the stator assembly yields a high symmetry for the wiring arrangement. Specifically, if all subsets of stator segments are distributed in such a manner the number of electric cables, which have to be installed in different angular regions, does not vary strongly. In particular, there may be no angular region existing which is free from all electric cables. This means that the wiring assembly occupies in all angular regions a similar volume of space.

According to a further embodiment the at least two subordinate interfaces are distributed uniformly along the circular outer edge or the at least two subordinate interfaces are distributed in a non-uniform manner along the circular outer edge.

Spatially arranging the at least two subordinate interfaces uniformly along the circular outer edge may mean that the angular distance between the at least two subordinate interfaces is the same when "traveling" along the circular outer edge in a given direction, e.g. in a clockwise direction. In case of exactly two subordinate interfaces this angular distance is 180°. In case of three subordinate interfaces the angular distance between two neighboring subordinate interfaces is 120°. Generally, in case of N uniformly distributed subordinate interfaces the angular distance between two neighboring subordinate interfaces is 360°/N.

Spatially arranging the at least two subordinate interfaces in a non-uniform manner may allow to design the entire wiring arrangement in a highly flexible manner. Specifically, the design of the wiring arrangement may take into account other spatial constraints at or within the generator and/or the nacelle of the wind turbine. In case of more than two subordinate interfaces, a third interface may be spatially located in the same angular region as the first subordinate interface (which is spatially separated from the second subordinate interface). In case of four subordinate interfaces respectively two of them could be located within one and the same region.

According to a further embodiment the stator assembly further comprises a first subordinate circuit breaker, which is electrically connected with the first subordinate interface and which is electrically connectable with a first subordinate power transceiver of the power transceiver. Alternatively or in combination the stator assembly further comprises a second subordinate circuit breaker, which is electrically connected with the second subordinate interface and which is electrically connectable with a second subordinate power transceiver of the power transceiver. This may provide the advantage that for instance in case of a failure of one of the stator segments an electric generator comprising the described stator assembly can be kept in operation by opening the subordinate circuit breaker which is assigned to the failed stator segment (and other typically not failed stator segments which are assigned to the same subset of stator segments and which are connected also to the opened subordinate circuit breaker.

In this respect it is mentioned that such a continued operation (with a reduced power production) of the electric generator can be realized in a smooth manner in particular in case the stator segments of the respective subset are distributed uniformly along the circular outer edge (as described above). This means that all the stator segments, which are no longer in operation, are distributed uniformly and an opening of the circuit breaker does not cause an asymmetry of the electric power production along the circular outer edge of the outer annular frame.

According to a further embodiment the stator assembly further comprises cable holders which are attached to the outer annular frame. Thereby, each cable holder provides support for a plurality of electric cables and in particular for several wiring assemblies when being routed in a circumferential direction along and next to the outer annular frame.

When mounting the wiring arrangement to the outer annular frame the cable holders may facilitate a precise and tidy spatial cable configuration. Further, after having established a proper spatial cable configuration the described cable holders can ensure that the proper spatial cable configuration will be maintained.

In a simple embodiment the cable holders are realized with rods which extend in an axial direction of the stator assembly, i.e. parallel to the center axis. A fixation of the cables to the respective rod may be realized for instance by means of appropriate fixation means such as clamping elements and/or cable straps.

According to a further embodiment the stator assembly further comprises cable fixation means which are also attached to the outer annular frame, wherein each cable fixation means fixes an end section of one wiring assembly, which end section runs at least approximately in a radial direction in order to electrically contact a respective stator segment.

With the described cable fixation means respectively one wiring assembly can be guided from the circular main region of the wiring arrangement radially outwards to one stator segment. This means that the direction of the respective wiring assembly has to be changed from the circumferential or tangential direction at least approximately to the radial direction. This requires a cable bending by at least approximately 90°. Also the described cable fixation means provide a significant contribution to a precise and tidy spatial cable configuration.

The described cable fixation means or device and/or any other mechanical structures which are in mechanical contact with at least one of the electric cables may be made from or may at least comprise at its outer surface an electrically insulating material. This may provide the advantage that the electric insulation between different electric cables and/or the electric insulation between at least one electric cable and other components of the annular structure can be improved. This may result in an improved operational reliability of the stator assembly respectively of the respective electric generator.

In preferred embodiments in particular the cable fixation means or device are made from a glass fiber composite material.

According to a further embodiment the stator assembly further comprises a first electromagnetic compatibility (EMC) shielding arrangement which is attached to the outer annular frame and which, together with a sidewall of the outer annular frame, forms a first channel in which the wiring assemblies are routed along and next to the outer annular frame.

With the described first EMC shielding arrangement electromagnetic radiation, which is emitted by each cable carrying a high power AC current, will be significantly attenuated. This may provide the advantage that the risk of perturbances of electronic devices, which may have a limited EMC, can be effectively reduced. Such electronic devices may be in particular controllers for controlling the operation of a wind turbine and which are situated in a nacelle of the wind turbine. Examples for such controllers are e.g. a controller for controlling the above mentioned high power semiconductor switches of the power converter, blade pitch angle adjustment controllers, etc.

The first channel may be a predominantly closed channel. This may mean that apart from (i) a larger opening representing a cable outlet for a plurality of electric cables towards the electric power interface or (ii) at least two medium sized openings representing a cable outlet towards the above described subordinate interfaces the first channel may only have a plurality of small openings wherein respectively one wiring assembly is let through for connecting the respective one of the plurality of stator segments.

Preferably, the above mentioned cable holders are located within the first channel. Thereby, for the plurality of wiring arrangements a high level of tidiness can be established and maintained within the first channel. The cable holders may also be configured for increasing the mechanical stability of the first EMC arrangement. This may provide the advantage that the EMC arrangement can be realized with comparatively thin metal plates or sheet metal.

According to a further embodiment the stator assembly further comprises a second EMC shielding arrangement, which (i) is also attached to the outer annular frame, which (ii) is located radially outwardly from the first EMC shielding arrangement, and which (iii) is configured for shielding electromagnetic radiation being emitted from the electric coils of the stator segments.

In order not to mechanically and/or spatially interfere with an air gap being provided in between the stator segments and permanent magnets being mounted to a rotor frame structure the second EMC shielding arrangement may form an open second channel. In a cross section within a plane being defined by the center axis and a radial direction of the stator assembly the second EMC shielding arrangement may have the shape of a bracket with two end sections, wherein one end section is free (i.e. not supported) and the other end section is mounted to the outer annular frame.

Within the open second channel there may be located stator segment end windings and/or local stator segment bus bars which may be used for interconnecting different coils of one and the same stator segment. Shielding the stator segment end windings has the effect that specifically those coil portions are shielded, which coil portions have the strongest curvature (i.e. the axial portions of the coils are typically straight metal rails) and which, as a physical consequence, represent the most radiative portion with regard to the emission of electromagnetic radiation in particular in the axial direction. Further, the rotor frame structure and in particular the permanent magnets being located radially outwardly from the stator segment also provide for some EMC shielding.

In the radial direction the second EMC shielding arrangement may overlap with the first EMC shielding arrangement. This may improve the EMC shielding capability in particular because also end sections of the electric cable which run more or less in a radial direction in order to contact the respective stator segment will be shielded.

The above described cable fixation means may be attached to the outer annular frame at a position in between the first EMC shielding arrangement and the second EMC shielding arrangement or at a radial position at which there is a spatial overlap between the two EMC shielding arrangements.

According to a further embodiment the first EMC shielding arrangement and/or the second EMC shielding arrangement is/are build up with a plurality of EMC segments.

Segmented EMC shielding arrangements may provide the advantage that the EMC shielding can be realized in an easy and effective manner. In a circumferential direction neighboring EMC segments may overlap with each other.

In preferred configurations the described EMC segments are made from thin metal plates which are spatially shaped in an appropriate manner in order to yield an annular shielding structure for the respective EMC shielding arrangement. The metal plates may be made from a sheet metal.

According to a further embodiment the stator assembly further comprises an inner annular frame, which is arranged concentrically around the center axis and which mechanically connects with a circular inner edge of the outer annular frame. Thereby, the outer annular frame comprises two inclined annular walls which, along a radial direction, spread apart from each other such that in between a first inclined annular wall and the second inclined annular wall there is formed an accommodation space.

By providing an accommodation space in between the two inclined annular walls of the outer annular frame a mechanically protected region is created which can be used for accommodating functional components of the stator assembly and/or of an electric generator comprising the described stator assembly. The provided accommodation space may be used for instance for accommodating cooling equipment being used for cooling temperature sensitive components, in particular the described stator segments, of the electric generator.

Due to the described "spreading apart" between the two inclined annular walls the widths respectively the height along the center axis of the accommodation space increases with increasing radial distance. Therefore, in radially outer positions larger functional components can be accommodated within the accommodation space than in radially inner positions.

With respect to a symmetry plane being oriented perpendicular to the center axis and being defined by the main extension of the inner annular frame, the first inclined annular wall can be located at one side of this symmetry plane whereas the second inclined annular wall can be located at the opposite side of this symmetry plane. With this symmetry plane the two inclined annular walls may form the same angle, when viewing the described stator assembly in a cross sectional plane being defined by the center axis and the radial direction. This angle may be e.g. in the range between 20° and 50°, in particular between 25° and 45°, and more particular between 30° and 40°.

In the three dimensional space the first inclined annular wall and/or the second inclined annular wall may have at least approximately the shape of the curved surface area of a truncated cone.

According to a further embodiment the outer annular frame further comprises an annular flange, which extends along the axial direction and which is arranged in between the inner annular frame and a radial inner edge of the second inclined annular wall. Descriptive speaking, the second inclined annular wall is not directly formed at respectively does not directly contact the inner annular frame. In fact the described annular flange is interconnected between an outer edge of the inner annular frame and the second inclined annular wall. This means that the described annular flange "shifts" the second inclined annular wall away from the first inclined annular wall. This has the effect that the size respectively the volume of the accommodation space is increased, wherein this increase is directly proportional to the axial extension of the annular flange. As a consequence, the number and/or the size of functional components of the stator assembly, which functional components can be accommodated within the accommodation space, will be increased respectively enlarged.

Extending "along the axial direction" does not necessarily mean that the annular flange extends solely along the axial direction. However, a solely axial extension may be of advantage because the increase of the accommodation space will be maximized.

At this point it is mentioned that the described annular flange is an optional part of the outer annular frame. Without the described annular flange the two inclined annular walls may represent two sides of a triangle.

It is mentioned that the described annular flange introduces an axial asymmetry to the outer annular frame respectively to the entire stator assembly. This asymmetry may be of benefit in order to allow for a precise and tidy spatial cable configuration, wherein the described wiring arrangement also provides for an axial asymmetry of the stator assembly. Preferably, the wiring arrangement is mounted at and/or routed along the second inclined annular wall.

According to a further aspect of embodiments of the invention there is provided an electric generator, in particular an electric generator for a wind turbine. The provided electric generator comprises (a) a stator assembly as described above and (b) a rotor assembly, which is configured and supported such that it can rotate around the center axis. The electric generator may have in particular an inner stator-outer rotor configuration.

The described electric generator is based on the idea that by realizing the wiring arrangement with (flexible) cables the spatial design of electric winding within a housing of the generator can be formed in an appropriate manner. Specifically, the electric cables can be bent in such a manner that spatial limitations and/or constraints given within a housing of the generator for the electric wiring of the stator segments can be met.

Just for the sake of clarity it is mentioned that in the described (optional) inner stator-outer rotor configuration the stator segments comprising electric coils are oriented radially in the outer direction. Magnets of the rotor assembly produce, during normal operation, a time varying magnetic field at the stator segments. Thereby, the magnets may be in particular permanent magnets, which are arranged at the inner side of an outer wall of the rotor assembly. For attaching the magnets, axially oriented slots may be provided at this inner side, wherein the magnets can be axially inserted into these slots. Furthermore, in between the stator segments and the (permanent) magnet there is provided an air gap. The mechanical stability of both the stator assembly and the rotor assembly must be high enough in order to ensure that a mechanical contact between the stator segments and the (permanent) magnets is excluded for any time.

According to a further embodiment the outer annular frame has a outer diameter larger than 7 m, in particular larger than 8 m, and more particular larger than 9 m.

With regard to the radial extension or dimension of the electric generator it should be clear that the larger the electric generator is the larger the electric wiring arrangements must be in order to provide for a reliable electric contact of the stator segments. Specifically, a large stator assembly requires long electric cables. In this context it should be clear that with the (flexible) electric cables of the described wiring arrangement stator segments, which are arranged along a long circular outer edge, can be electrically connected in an easy and reliable manner.

The radially outer dimension of the outer frame structure of the stator assembly or alternatively the radially outer side of the rotor assembly may define the geometric dimension of the described electric generator along the radial direction perpendicular to the center axis respectively the rotational axis.

According to a further aspect there is provided a wind turbine for generating electrical power. The provided wind turbine is in particular an off-shore wind turbine. The provided wind turbine comprises (a) a tower; (b) a wind rotor, which is arranged at a top portion of the tower and which comprises at least one blade; and (c) an electric generator as elucidated above. The electric generator is mechanically coupled with the wind rotor.

It has to be noted that embodiments of the invention have been described with reference to different subject matters. However, a person skilled in the art will gather from the above and the following description that, unless other notified, in addition to any combination of features belonging to one type of subject matter also any combination between features relating to different subject matters is considered as to be disclosed with this document.

The aspects defined above and further aspects of embodiments of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawing is schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously all such spatially relative terms refer to the orientation shown in the figures only for ease of description and are not necessarily limiting as an apparatus according to an embodiment of the invention can assume orientations different than those illustrated in the figures when in use.

Figure 1:
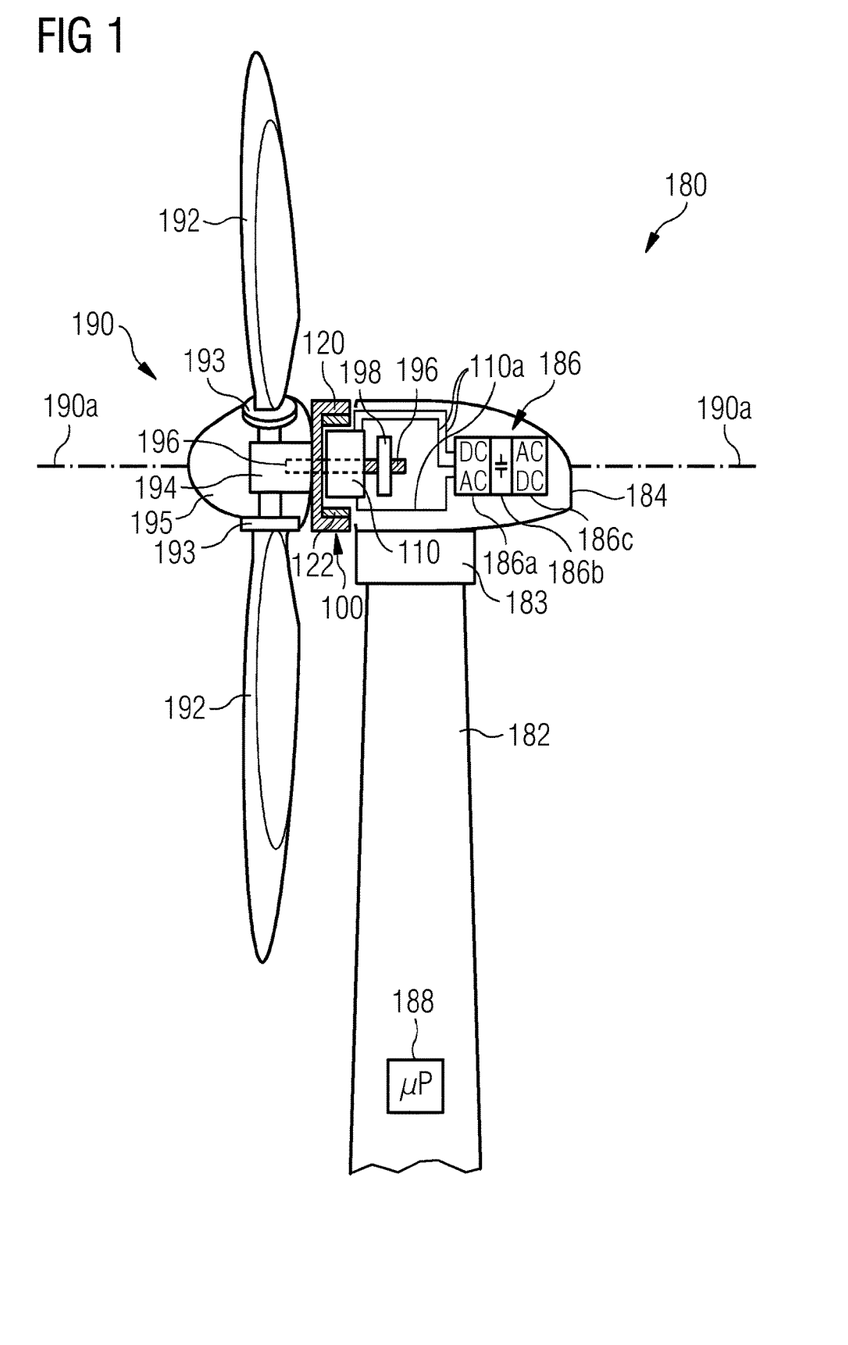
FIG. 1 shows in a wind turbine comprising an electric generator with a cable wiring arrangement (non-depicted)

FIG. 1 shows a wind turbine 180 according to an embodiment of the invention. The wind turbine 180 comprises a tower 182, which is mounted on a non-depicted fundament. On top of the tower 182 there is arranged a nacelle 184. In between the tower 182 and the nacelle 184 there is provided a yaw angle adjustment device 183, which is capable of rotating the nacelle 184 around a not depicted vertical axis, which is aligned basically with the longitudinal extension of the tower 182. By controlling the yaw angle adjustment device 183 in an appropriate manner it can be made sure, that during a normal operation of the wind turbine 180 the nacelle 184 is always properly aligned with the current wind direction.

The wind turbine 180 further comprises a wind rotor 190 having three blades 192. In the perspective of FIG. 1 only two blades 192 are visible. The wind rotor 190 is rotatable around a rotational axis 190a. The blades 192, which are mounted at a hub 194, extend radially with respect to the rotational axis 190a.

In between the hub 194 and a blade 192 there is respectively provided a blade adjustment device 193 in order to adjust the blade pitch angle of each blade 192 by rotating the respective blade 192 around a not depicted axis being aligned substantially parallel with the longitudinal extension of the blade 192. By controlling the blade adjustment device 193 the blade pitch angle of the respective blade 192 can be adjusted in such a manner that at least when the wind is not so strong a maximum wind power can be retrieved from the available wind power. However, the blade pitch angle can also be intentionally adjusted to a position, in which only a reduced wind power can be captured.

A spinner structure 195 covers the hub 195. By means of the spinner structure 195, which may also be denominated a nose cone, functional elements such as the blade adjustment devices 193 will be protected from rough external environmental impacts.

At the nacelle 184 there is provided an electric generator 100. In accordance with basic principles of electrical engineering the electric generator 100 comprises a stator assembly 110 and a rotor assembly 120. As can be seen from FIG. 1, the electric generator 100 is located between a front end of the nacelle 184 and the hub 194.

According to the embodiment described here the electric generator 100 is realized with a so called inner stator-outer rotor configuration. Permanent magnets 122 being attached to a rotor frame structure of the rotor assembly 120 travel around not depicted stator segments being attached at a stator frame structure of the stator assembly 110. In between the stator segments, which comprise coils or windings for picking up a time alternating magnetic induction, and the permanent magnets, there is formed an air gap.

According to the exemplary embodiment described here the stator assembly 110 has an outer diameter in the order of 10 m and the air gap has a size of 10 mm. From these dimensions one can recognize that there are extreme high demands regarding the mechanical precision and stability for both the stator assembly 110 and the rotor assembly 120. Further, it should be clear that the large size of the spatial arrangement of the entirety of all stator segments requires a suitable electric wiring arrangement for forwarding the electric power being generated by (the coils of) the stator segments to an electric power transceiver. According to the exemplary embodiment described here this electric power transceiver is a power converter 186 which is described below in more detail.

The wind rotor 190 is rotationally coupled with the rotor assembly 110 by means of a rotatable shaft 196. A schematically depicted bearing assembly 198 is provided in order to hold in place both the wind rotor 190 and the rotor assembly 120. As can be seen from FIG. 1, the shaft 196 extends along the rotational axis 190a. The rotational axis 190a is identical with a center axis of the stator assembly 110.

It is mentioned that there is also a not depicted bearing assembly being located within the generator 100. This bearing assembly supports the shaft 196 within the region where the shaft 196 is indicated with dashed lines.

It is further mentioned that the wind turbine 180 is a so called direct drive wind turbine wherein between wind rotor 190 and rotor assembly 110 there is not provided a gear box. However, it is mentioned that the electric generator 100 could also be driven indirectly via a gear box, which may be used to convert the number of revolutions of the wind rotor 190 typically into a higher number of revolutions of the rotor assembly 120.

In order to provide an AC power signal being matched with a utility grid the electric output of the stator assembly 110 is electrically connected to the above mentioned power converter 186 by means of a three phase electric cable assembly. The respective cables are denominated with reference numeral 110a. The power converter 186 comprises a generator side AC-DC converter 186a, an intermediate DC bridge 186b, and a grid side DC-AC converter 186c. The AC-DC converter 186a and the DC-AC converter 196c comprise several not depicted high power semiconductor switches which, in a known manner, are arranged in a bridge configuration for each phase of an AC current provided by the electric generator 100.

The wind turbine 180 further comprises a control system 188 for operating the wind turbine 100 in a highly efficient manner. Apart from controlling for instance the yaw angle adjustment device 183, the depicted control system 188 is also used for adjusting the blade pitch angle of the blades 192 of the wind rotor 190 in an optimized manner.

Figure 2:
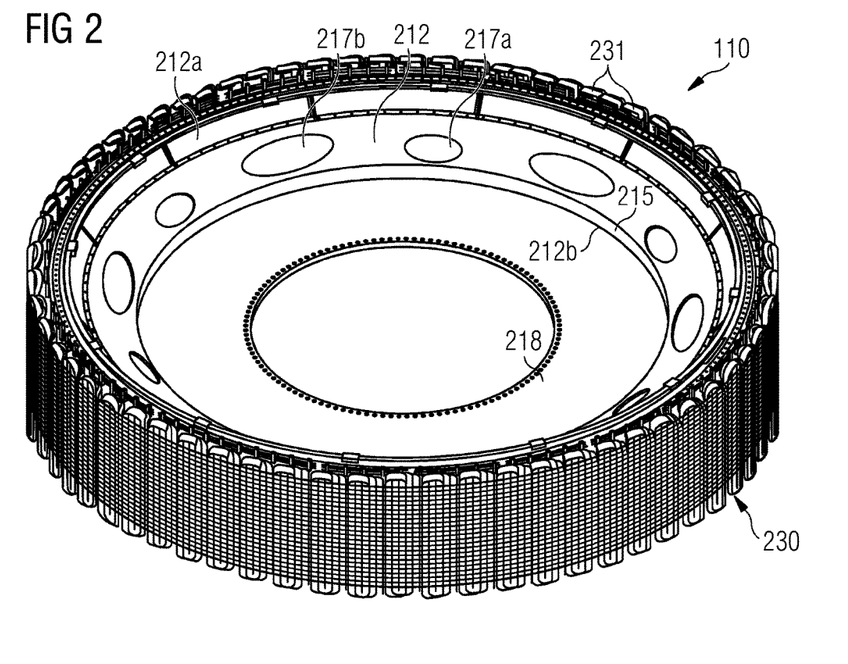
FIG. 2 shows the stator assembly with a plurality of stator segments mounted at the radially outer edge.

FIG. 2 shows in more detail the stator assembly 110. The stator assembly 110 is an annular structure which is located in a concentric manner with regard to the rotational axis 190a. The stator assembly 110 comprises an inner annular frame 218 which surrounds a non-depicted bearing assembly. This bearing assembly provides rotational support for the rotor assembly 120 as depicted in FIG. 1. An outer annular frame 212 having a circular outer edge 212a and an inner edge 212b surrounds the inner annular frame 218. An annular flange 215 is provided in between the inner annular frame 218 and the outer annular frame 212. The annular flange 215 will be described in detail below when making reference to FIG. 3.

From the illustration shown in FIG. 2 it can be seen that within the outer annular frame 212 there are provided several openings 217a and several larger further openings 217b. According to the exemplary embodiment described here these openings 217a and these further openings 217b are used to provide an access to an accommodation space which is formed within the outer annular frame and which will be described below in detail when making reference to FIG. 3. According to the exemplary embodiment described here the openings 217a are intended as an entrance for a human service technician to enter this accommodation space. The further openings 217b serve as a gate for bringing comparatively large components, in particular cooling installations, into the accommodation space and, if necessary, to remove such large components out from the accommodation space.

As can be further seen from FIG. 2, the stator assembly comprises a plurality of stator segments 230 each having several electric coils or windings 231. The entire circumference respectively the entire radially outer edge 212a of the stator assembly 110 is covered with these stator segments 230. As a consequence, along the circumferential direction the electric coils 231 are arranged one next to each other without any significant gap. This allows for an effective conversion of mechanical energy, which drives the rotor assembly 120 shown in FIG. 2, into electric energy generated from the time alternating magnetic flux which is picked up by the plurality of stator segments 230.

According to the exemplary embodiment described here the stator assembly 110 has an outer diameter in the order of 10 m. This means that there is a significant effort for providing a suitable electric connection to the (electric coils of all) stator segments 230. In order to realize such an electric connection in an easy and reliable manner a suitable wiring arrangement is provided. This wiring arrangement will be described below in detail in particular with reference to FIGS. 5 and 6.

Figure 3:
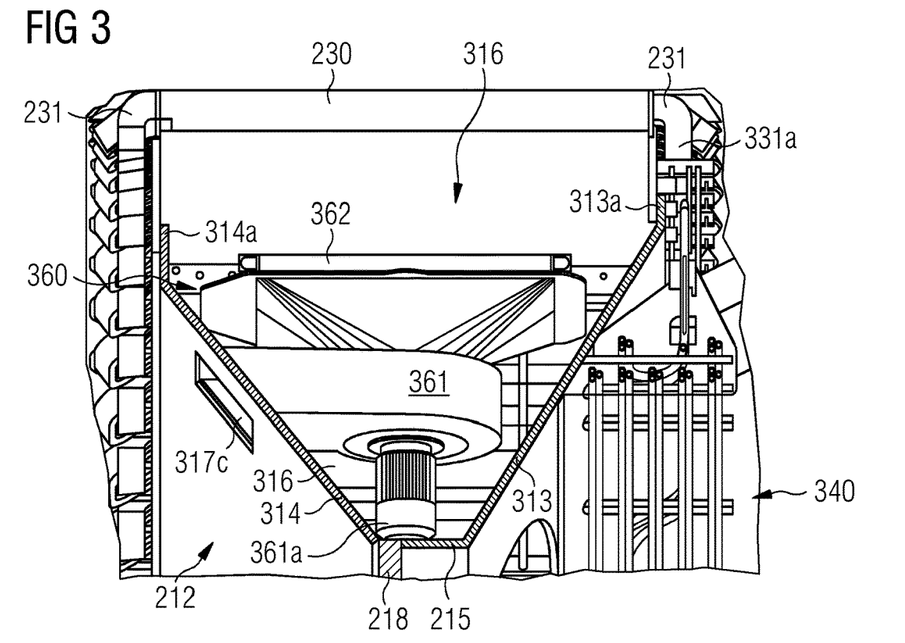
FIG. 3 shows in a cross sectional view an outer annular frame of the stator assembly with the attached stator segments and cooling installations provided within an accommodation space.

FIG. 3 shows within a plane being defined by the radial direction and the axial direction of the stator assembly 110 a cross sectional view of the outer annular frame 212. As can be seen, the outer annular frame 212 comprises a first inclined annular wall 313 and a second inclined annular wall 314. The second inclined annular wall 314 directly extends from an outer edge of the inner annular frame 218. The first inclined annular wall 313 indirectly extends from the outer edge of the inner annular frame 218. Specifically, the annular flange 215 mentioned already above is located in between the outer edge of the inner annular frame 218 and the inner edge of the first inclined annular wall 313.

In between the first inclined annular wall 313 and the second inclined annular wall 314 there is provided an accommodation space 316. It is apparent that the volume of the accommodation space 316 increases with the length of the annular flange 251 in the axial direction. According to the embodiment described here the accommodation space 316 is used for accommodating a cooling installation 360, which is used for cooling components of the respective electric generator, which components are heated up during an operation of the electric generator. Typically the stator segments 230 and in particular their electric coils 231 are the components which require a significant cooling in order to guarantee a reliable operation of the electric generator.

According to the embodiment described here the cooling installation 360 comprises a ventilation device 361 driven by an electric motor 361a. A flow of air, which is used as the cooling medium for the stator segments 230, is driven by the ventilation device 361 and streams or flows through an aperture 317c formed within the second inclined annular wall 314. A heat exchanger 362 being arranged within the airflow (and within the accommodation space 316) is used for cooling down the air. The heat exchanger 362 acts as a liquid-gaseous interface for the entire cooling concept.

It can be seen that according to the embodiment described here the cooling installation 360 occupies most of the area of the cross section of the accommodation space 316. Further, along the circumference of the outer annular frame 212 there are provided a plurality of such cooling installations 360 such that the volume of the accommodation space 316 is utilized to a high extend respectively in a spatially effective manner. From this spatially effective utilization of the accommodation space 316 it should be clear that according to the embodiment described here it makes sense to provide the outer annular frame 212 with a plurality of openings 217a and further openings 217b in order to allow a service technician to enter the accommodation space 316 at different positions along the circumference of the outer annular frame 212.

The stator segment 230 shown in the cross sectional view of FIG. 3 is mechanically supported at a first radial outer edge 313a of the first inclined annular wall 313 and at a second radial outer edge 314a of the second inclined annular wall 314. The electric coils 231 each having at least one lateral end winding 331a is electrically connected with a wiring arrangement 340. Details about the wiring arrangement 340 are presented below in particular with reference to FIGS. 5 and 6.

Figure 4:
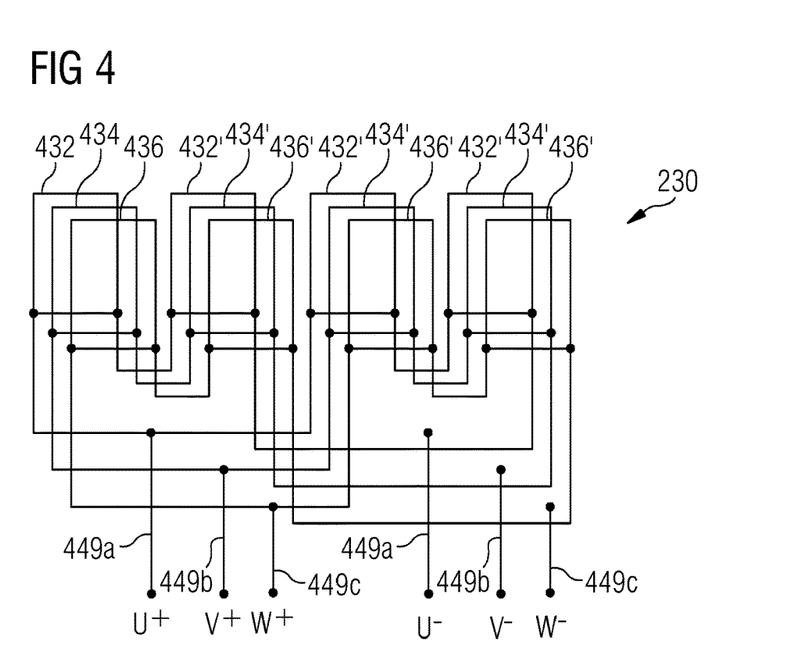
FIG. 4 illustrates a layout of an electrical connection between altogether twelve coils of one stator segment.

FIG. 4 illustrates in accordance with an embodiment of the invention a layout of an electrical connection between altogether twelve electric coils of one and the same stator segment 230.

Specifically, the stator segment 230 comprises a first electric coil 432, a second electric coil 434, and a third electric coil 436. In accordance with known stator segment designs the first electric coil 432 is assigned to a first phase (U) of a three phase electric current, the second electric coil 434 is assigned to a second phase (V) of the three phase electric current, and the third electric coil 436 is assigned to a third phase (W) of the three phase electric current. A first electric cable 449a is assigned to the first electric phase (U), a second electric cable 449b is assigned to the second electric phase (V), and a third electric cable 449c is assigned to the third electric phase (V).

As can be seen from FIG. 4, according to the embodiment described here, the stator segments 230 further comprises altogether
- three further first electric coils 432' being assigned to the first electric phase (U),
- three further second electric coil 434' being assigned to the second electric phase (V), and
- three further third electric coils 436' being assigned to the third electric phase (W).

From the depicted layout one can see that from the four electric coils, which are assigned to one and the same electric phase, two of them are respectively connected in series and the resulting two pairs of series connected electric coils are connected in parallel.

Figure 5:
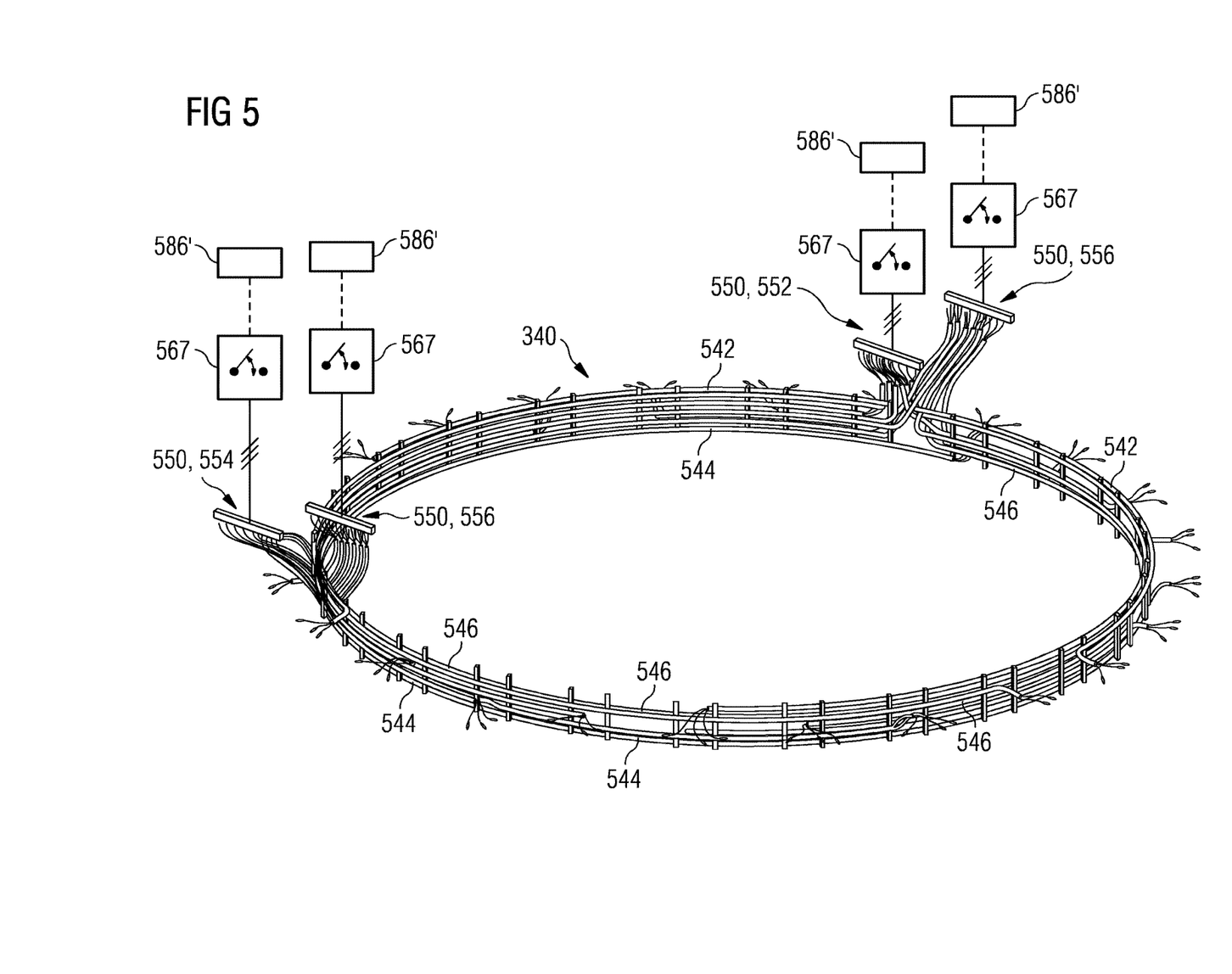
FIG. 5 shows the layout of an entire wiring arrangement comprising several wiring assemblies.

FIG. 5 shows the layout of the wiring arrangement 340. According to the exemplary embodiment described here the wiring arrangement comprises four subordinate wiring arrangements. For the sake of clarity of the illustration exclusively one wiring assembly 641 of these wiring assemblies is shown in FIG. 6.

Figure 6:
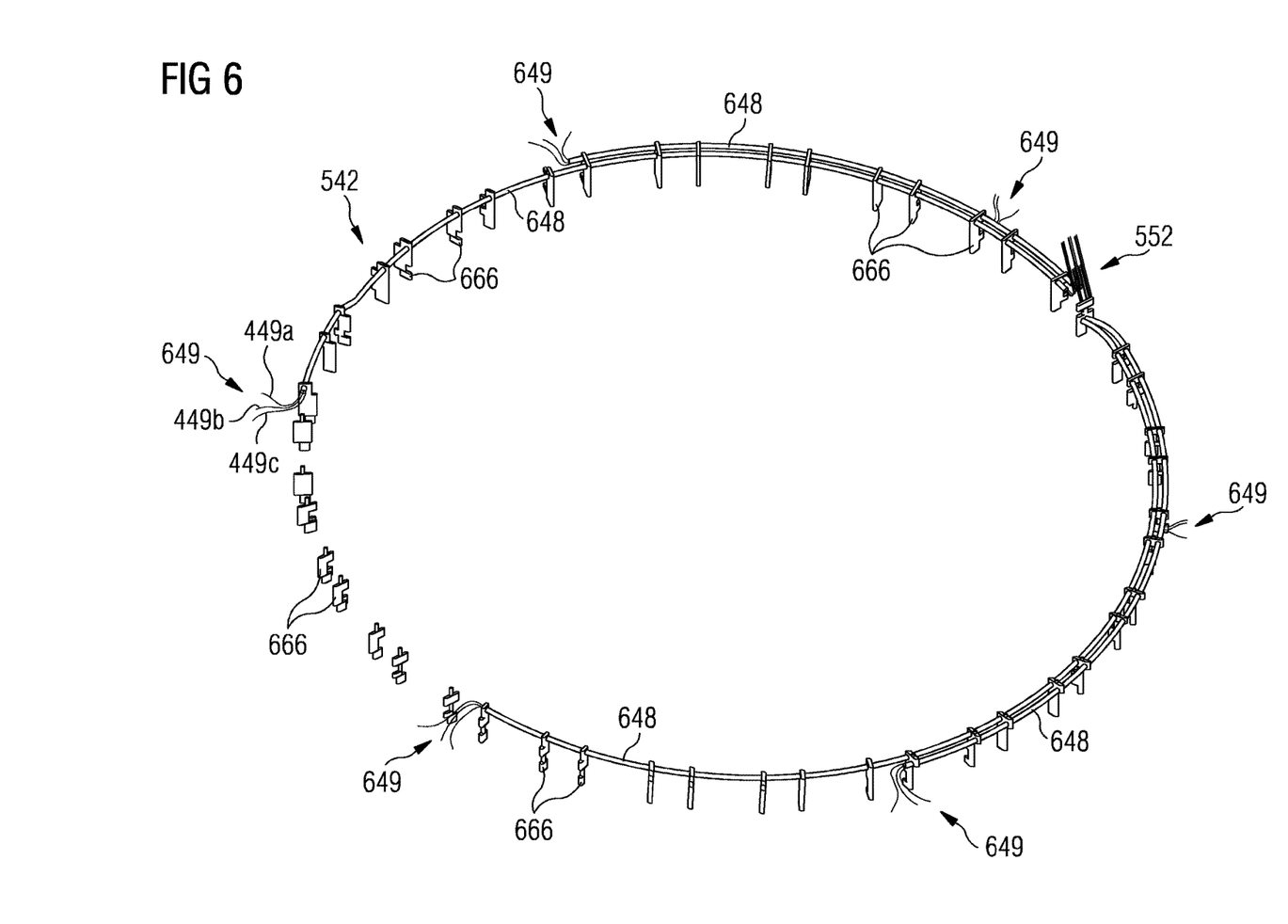
FIG. 6 shows the layout of a wiring assembly comprising, for each stator segment, three flexible cables which are fixed at cable holders which are attached to the not depicted outer annular frame.

As one can take from these FIGS. 5 and 6, the wiring arrangement 340 connects the plurality of not depicted stator segments with an electric power interface 550. The electric power interface 550 is a spatially distributed interface comprising four subordinate power interfaces, a first subordinate power interface 552, a second subordinate power interface 554, and two further subordinate power interfaces 556. According to the embodiment described here the first subordinate power interface 552 is spatially separated from the second subordinate power interface 554. Respectively one further subordinate power interface 556 is located close to the first subordinate power interface 552 and to the second subordinate power interface 554.

The wiring arrangement 340 comprises four subordinate wiring arrangements, a first subordinate wiring arrangement 542, a second subordinate wiring arrangement 544, and two further subordinate wiring arrangements 546. As can be seen from FIG. 5, respectively one subordinate wiring arrangement is assigned to one of the subordinate power interfaces.

The reason for the division of the wiring arrangement 340 into different subordinate wiring arrangements is that the entire number of stator segments 230 is subdivided into different subsets of stator segments, here four subsets of stator segments. According to the exemplary embodiment described here the subdivision is symmetric in that along the circumference of the circular outer edge 212a there is a defined sequence regarding the assignment of stator segments 230 to the different subsets being connected with respectively one subordinate wiring arrangement. Specifically, when turning e.g. a clockwise and starting at a certain angular position the first stator segment is assigned to the first subset of stator segments, the second stator segment is assigned to the second subset of stator segments, the third stator segment is assigned to the third subset of stator segments, the fourth stator segment is assigned to the fourth subset of stator segments, the fifth stator segment is again assigned to the first subset of stator segments, the sixth stator segment is again assigned to the second subset of stator segments, and so on.

As can be seen from FIG. 5, according to the exemplary embodiment described here each subordinate power interface 552, 554, 556 is connected with respectively one circuit breaker 567. Further, each circuit breaker 567 is connected with respectively one subordinate power converter 586'. This configuration provides the advantage that in case of a damage or in case of a failure of one stator segment the operation of the electric generator can be continued by opening the subordinate circuit breaker 567 which is assigned to the failed stator segment and the other typically not failed stator segments (a) being assigned to the same subset of stator segments and (b) being connected also to the opened subordinate circuit breaker 567. Thereby, advantage is taken from the matter of fact that according to the exemplary embodiment described here the power converter 186 shown in FIG. 1 is subdivided into the four subordinate power converters 586'. In case of a typically equally generated power distribution among the different subsets of stator segments opening one subordinate circuit breaker 567 results in a decrease of the power production from 100% to 75%. Correspondingly, opening two subordinate circuit breakers 567 would, in the embodiment described here, reduce the power production by a factor of 2.

As can be seen from FIG. 6, each subordinate wiring arrangement and here specifically the first subordinate wiring arrangement 542 comprises several wiring assemblies 648. According to the exemplary embodiment described here each subordinate wiring arrangement consists of six wiring assemblies 648. Each wiring assembly 648 extends between the respective subordinate power interface 552 and one of a plurality of electric connections 649 to respectively one stator segment 230. According to the exemplary embodiment described here the stator segments 230 are designed such that in each stator segment 230 there is produced a current for each phase of a three phase current. Therefore, each wiring assembly 648 comprises the three cables 449a, 449b, and 449c, which have already been mentioned above with reference to FIG. 4.

FIG. 6 shows with reference to the subordinate wiring arrangement 542 a further advantageous feature of the subordinate wiring arrangements. According to the exemplary embodiment described here the above described symmetry is realized by means of two branches which form the subordinate wiring arrangement 542. In FIG. 6, a first (upper left) branch extends from the subordinate power interface 552 in a counter clockwise direction, the second (lower right) branch extends from the subordinate power interface 552 in the clockwise direction. Between the ends of the two branches there is a gap. This configuration allows to electrically connect each stator segment 230 with a minimum entire cable length.

It is mentioned that with regard to the total number "N" of stator segments, the number "ns" of subsets of stator segments respectively subordinate power interfaces, and the number "nd" of stator segments respectively electric connections being assigned to one subset respectively one subordinate power interface there exists the following relationship:

$$nd=N/ns$$

It should be clear that embodiments of the invention are not limited to the number of the subordinate wiring arrangements respectively to the number of subordinate power interfaces. In other embodiments the number of subordinate wiring arrangements respectively subordinate power interfaces is two, three, five, six, seven, eight, or more.

In a currently preferred embodiment the total number "N" of stator segments is 24 and the number "ns" of subsets of stator segments respectively of subordinate power interfaces is 4. As a consequence, the number "nd" of stator segments respectively electric connections being assigned to one and the same subset respectively one and the same subordinate power interface is 4.

As can be best seen from FIG. 6 the cables 449a, 449b, 449c of all wiring assemblies 648 (and of the entire wiring arrangement 340) are spatially hold in place by means of cable holders 666. These cable holders 666 are attached to the outer annular frame 212 which is not depicted in FIGS. 5 and 6.

Figure 7:
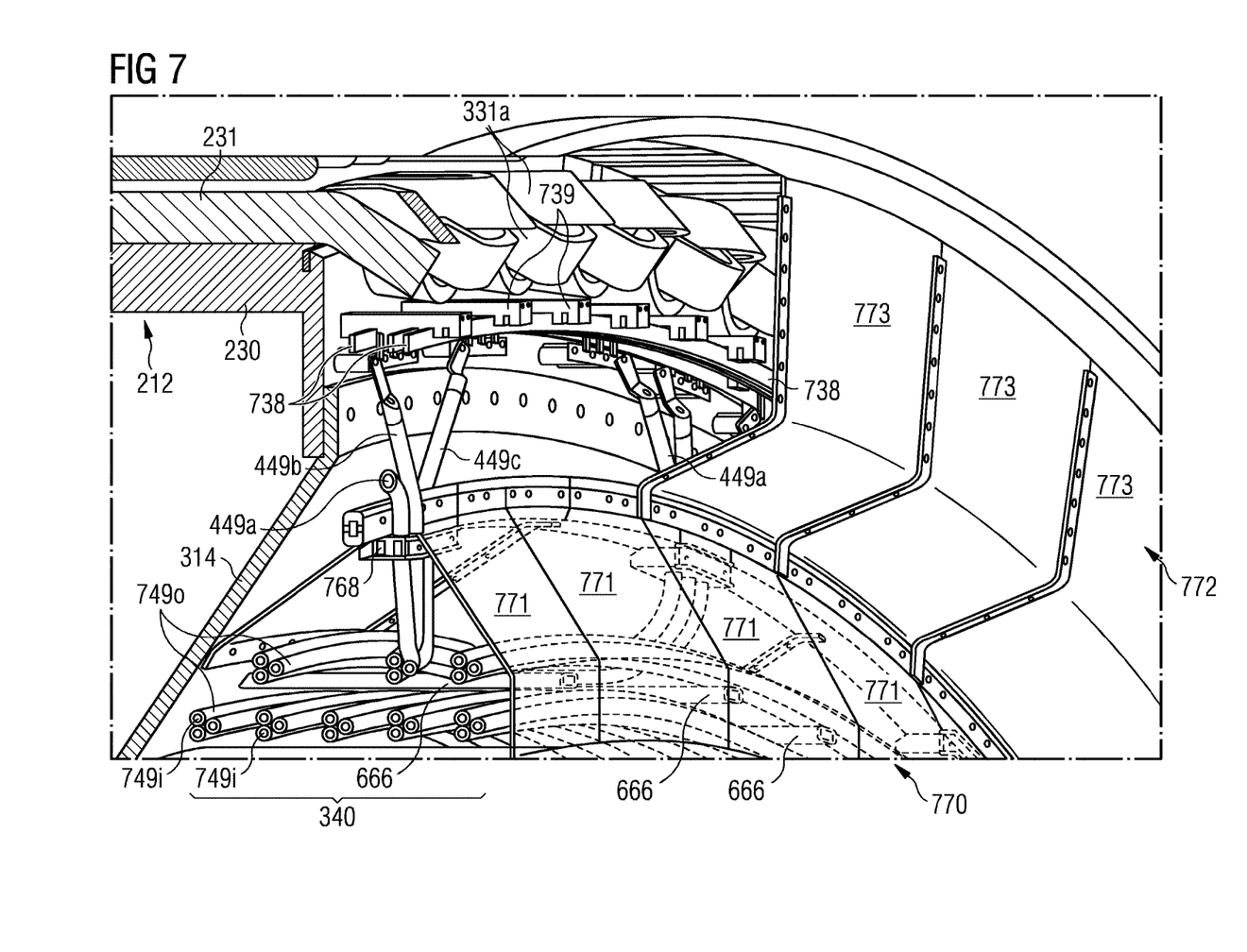
FIG. 7 shows in a perspective half sectional view the outer annular frame with two EMC shielding arrangements wherein one EMC shielding arrangement is assigned to the wiring arrangement and the other shielding arrangement is assigned to end windings of the stator segments.

FIG. 7 shows in a perspective half sectional view the outer annular frame 212 and stator segments 230 mounted at the radially outer side of the outer annular frame 212. The cable arrangement 340 respectively its wiring assemblies, which are routed in a circumferential direction along and next to the outer annular frame 212, run within an electromagnetic compatibility (EMC) channel, which is provided by a first EMC shielding arrangement 770. According to the exemplary embodiment described here the first EMC shielding arrangement 770 comprises a plurality of first EMC segments 771. The first EMC segments 771 are made from thin metal plates which are spatially shaped in an appropriate manner in order to yield, together with the side surface of the second inclined annular wall 314, an annular EMC shielding structure for the wiring arrangement 340.

As can be seen from FIG. 7, the above mentioned cable holders 666 are also located within this EMC channel. Preferably, the cable holders 666 not only have the purpose of holding the cables of the wiring arrangement in place. The cable holders 666 may also represent a structural component of the first EMC shielding arrangement 770, which structural component improves the mechanical stability of the first EMC shielding arrangement 770.

As can be further seen from FIG. 7, there is provided a second EMC shielding arrangement 772, which is located radially outwards from the first EMC shielding arrangement 770. Both EMC shielding arrangements 770 and 772 have an overlap with each other such that there is a spatially complete EMC shielding (at least along the radial direction). The second EMC shielding arrangement 772 forms an open channel within which the end portions of the cables 449a, 449b, and 449c are located. As can be seen from FIG. 7, also local bus bars 738 being assigned to exclusively one stator segment 230 and end windings 331a are EMC shielded by the second EMC shielding arrangement 772. It is mentioned that in particular the outer frame of the rotor assembly 120 and/or the permanent magnets 122 being mounted at the radially inner wall of this outer frame of the rotor assembly 120 also provide for an effective EMC shielding. Therefore, the matter of fact, according to which the second EMC shielding arrangement 772 forms an open EMC channel, has no negative EMC effects.

According to the exemplary embodiment described here the second EMC shielding arrangement 772 comprises a plurality of second EMC segments 773. Also the second EMC segments 773 are made from thin metal plates which are spatially shaped in an appropriate manner in order to yield an annular EMC shielding structure for the end windings 331a, the local bus bars 738, and the end portions of the cables 449a, 449b, and 449c.

It is clear that the larger the number of stator segments 230 is, the larger is the effort for realizing a tidy spatial arrangement of the plurality of electric cables. Specifically, within the first EMC shielding arrangement the electric cables (being attached to the cable holders 666) run at least predominantly along a circumferential direction. However, when contacting a specific stator segment the end portions of the respective cables must run at least partially in a radial direction. This means that the respective cable must be bent by approximately 90°. The respective cable guiding is supported or realized by cable fixation means 768. As can be seen from FIG. 7, these cable fixation means 768 are configured for spatially fixing the respective electric cable end portions in an orientation which is at least approximately radial.

As can be further seen from FIG. 7, each electric cable 449a, 449b, 449c comprises an inner conductive core 749i and an outer insulating structure or jacket 749o. The outer insulating structures 749o insulate the respective inner conductive core 749i in particular (a) from the other inner conductive cores 749i, (b) from the cable holders 666, and (c) from the cable fixation means 768. This improves the electric reliability of the entire electric generator.

Figure 8:
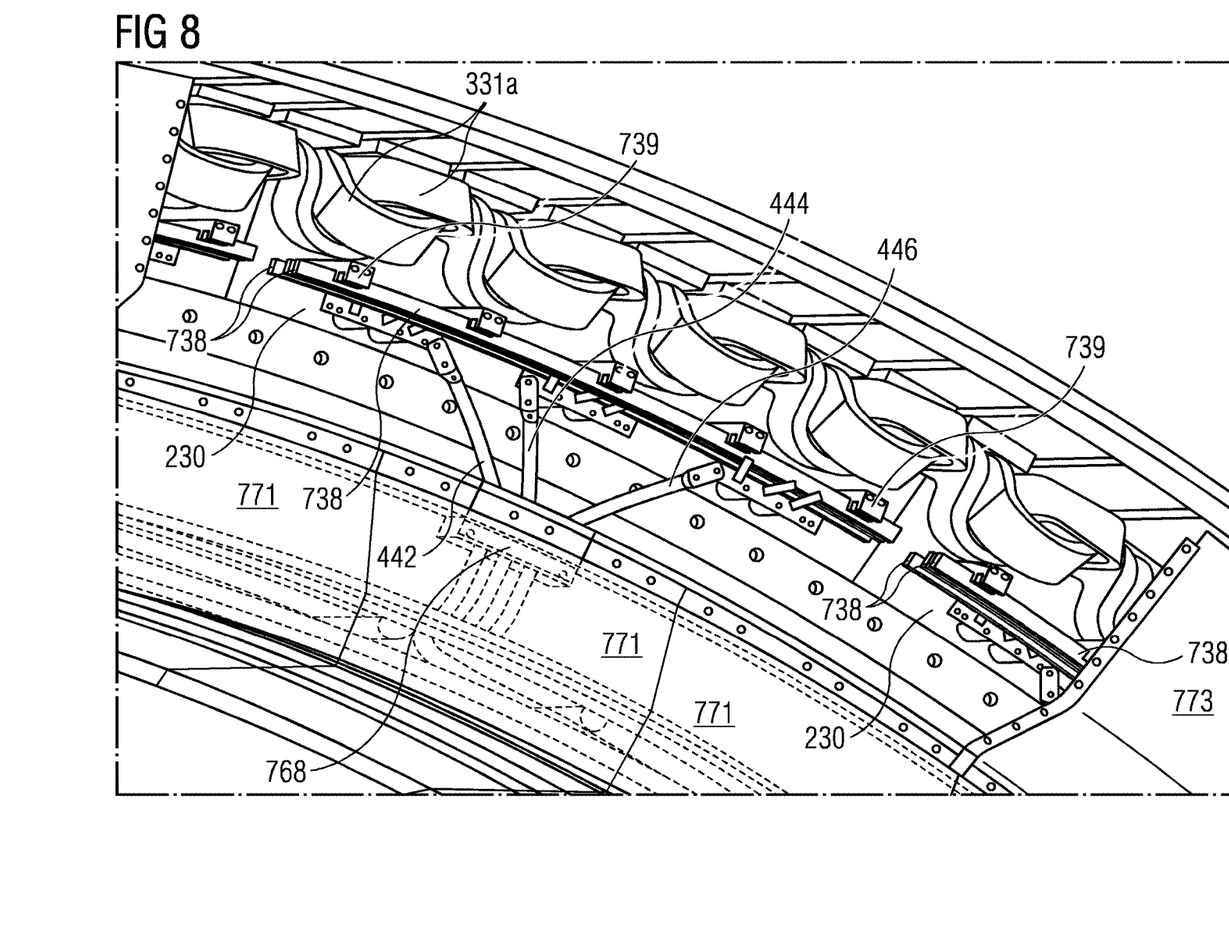
FIG. 8 shows in a perspective half sectional view an electric connection between different coils of one stator segment by means of three local bus bars.

FIG. 8 shows in a perspective half sectional view an electric connection between different coils of one stator segment 230 by means of three local bus bars 738. The local bus bars 738 are hold in place by means of appropriate bus bar holders 739.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A stator assembly comprising:
a stator frame structure having an outer annular frame with a circular outer edge running concentrically around a center axis, which defines an axial direction;
a plurality of stator segments being mounted at the outer edge along a circumferential direction of the outer edge, wherein each stator segment comprises at least one electric coil; and
a wiring arrangement electrically connecting the plurality of stator segments with an electric power interface for collecting electric power generated by the plurality of stator segments and forwarding the collected electric power to a power transceiver; wherein the wiring arrangement includes
a plurality of wiring assemblies, each wiring assembly electrically connecting one of the plurality of stator segments with the electric power interface, wherein each wiring assembly is routed along and next to the outer annular frame and comprises electric cables connected in between the electric interface and the respective stator segment, wherein the electric cables are provided with electric insulation structures each surrounding one of the electric cables, and wherein
the plurality of stator segments is subdivided into at least a first subset of stator segments and a second subset of stator segments, and the electric power interface comprises at least a first subordinate interface being assigned to the first subset and a second subordinate interface being assigned to the second subset, wherein the first subordinate interface and the second subordinate interface are spatially separated from each other.

2. The stator assembly as set forth in claim 1, wherein each wiring assembly is associated exclusively with one stator segment.

3. The stator assembly as set forth in claim 1, wherein the at least one electric coil comprises a first electric coil being assigned to a first electric phase of a three-phase current; a second electric coil being assigned to a second electric phase of the three-phase current; and
a third electric coil being assigned to a third electric phase of the three-phase current; and wherein each wiring assembly comprises
a first electric cable being connected to the first electrical coil;
a second electric cable being connected to the second electrical coil; and
a third electric cable being connected to the third electrical coil.

4. The stator assembly as set forth in claim 3, wherein each stator segment further comprises
- at least one further first electric coil being assigned to the first electric phase and being connected to the first electric cable;
- at least one further second electric coil being assigned to the second electric phase and being connected to the second electric cable; and
- at least one further third electric coil being assigned to the third electric phase and being connected to the third electric cable; wherein each one of the further electric coils is connected with the corresponding electric coil either in parallel or in series.

5. The stator assembly as set forth in claim 1, wherein the stator segments of the first subset are distributed uniformly along the outer edge and/or the stator segments of the second subset are distributed uniformly along the outer edge.

6. The stator assembly as set forth in claim 5, wherein the at least two subordinate interfaces are distributed uniformly along the outer edge or the at least two subordinate interfaces are distributed in a non-uniform manner along the outer edge.

7. The stator assembly as set forth in claim 5, further comprising
- a first subordinate circuit breaker, which is electrically connected with the first subordinate interface and which is electrically connectable with a first subordinate power transceiver of the power transceiver, and/or
- a second subordinate circuit breaker, which is electrically connected with the second subordinate interface and which is electrically connectable with a second subordinate power transceiver of the power transceiver.

8. The stator assembly as set forth in claim 1, further comprising cable holders which are attached to the outer annular frame, each cable holder providing support for a plurality of electric cables and in particular for several wiring assemblies when being routed in a circumferential direction along and next to the outer annular frame.

9. The stator assembly as set forth in claim 1, further comprising cable fixation means which are also attached to the outer annular frame, each cable fixation means fixing an end section of one wiring assembly, which end section runs at least approximately in a radial direction in order to electrically contact a respective stator segment.

10. The stator assembly as set forth in claim 1, further comprising a first electromagnetic compatibility, EMC, shielding arrangement which is attached to the outer annular frame and which, together with a sidewall of the outer annular frame, forms a first channel in which the wiring assemblies are routed along and next to the outer annular frame.

11. The stator assembly as set forth claim 10, further comprising a second EMC shielding arrangement, which is also attached to the outer annular frame, which is located radially outwardly from the first EMC shielding arrangement, and which is configured for shielding electromagnetic radiation being emitted from the electric coils of the stator segments.

12. The stator assembly as set forth in claim 11, wherein the first EMC shielding arrangement and/or the second EMC shielding arrangement are build up with a plurality of EMC segments.

13. The stator assembly as set forth in claim 12, further comprising an inner annular frame, which is arranged concentrically around the center axis and which mechanically connects with a circular inner edge of the outer annular frame, wherein the outer annular frame comprises two inclined annular walls which, along a radial direction, spread apart from each other such that in between a first inclined annular wall and a second inclined annular wall there is formed an accommodation space.

14. The stator assembly as set forth in claim 13, wherein the outer annular frame further comprises an annular flange, which extends along the axial direction and which is arranged in between the inner annular frame and a radial inner edge of the second inclined annular wall.

15. An electric generator for a wind turbine, the electric generator comprising a stator assembly as set forth in claim 1, and a rotor assembly, which is configured and supported such that it can rotate around the center axis; wherein in particular the electric generator has an inner stator-outer rotor configuration.

16. The electric generator as set forth in claim 15, wherein the outer annular frame has an outer diameter larger than 7 m, in particular larger than 8 m, and more particular larger than 9 m.

17. A wind turbine for generating electrical power, in an off-shore wind turbine, the wind turbine comprising a tower; a wind rotor, which is arranged at a top portion of the tower and which comprises at least one blade; and the electric generator as set forth in claim 15, wherein the electric generator is mechanically coupled with the wind rotor.

* * * * *